(12) United States Patent
Kokkonen

(10) Patent No.: US 7,684,525 B2
(45) Date of Patent: Mar. 23, 2010

(54) METHOD AND RECEIVER FOR RECEPTION OF A COMPOSITE SIGNAL

(75) Inventor: Mikko Kokkonen, Helsinki (FI)

(73) Assignee: Nokia Corporation, Espoo (FI)

( * ) Notice: Subject to any disclaimer, the term of this patent is extended or adjusted under 35 U.S.C. 154(b) by 385 days.

(21) Appl. No.: 10/501,049

(22) PCT Filed: Jan. 9, 2002

(86) PCT No.: PCT/EP02/00277

§ 371 (c)(1),
(2), (4) Date: Jul. 9, 2004

(87) PCT Pub. No.: WO03/058844

PCT Pub. Date: Jul. 17, 2003

(65) Prior Publication Data

US 2005/0084044 A1      Apr. 21, 2005

(51) Int. Cl.
*H04L 1/02* (2006.01)
*H04B 7/10* (2006.01)

(52) U.S. Cl. .................. 375/347; 375/267; 375/316; 455/132

(58) Field of Classification Search ............ 375/340, 375/341, 349, 316, 259, 260, 262, 224, 347, 375/267; 455/132
See application file for complete search history.

(56) References Cited

U.S. PATENT DOCUMENTS

| | | | | |
|---|---|---|---|---|
| 4,980,897 A | * | 12/1990 | Decker et al. | ................ 375/265 |
| 5,822,380 A | * | 10/1998 | Bottomley | .................. 375/347 |
| 6,084,928 A | * | 7/2000 | Kuwahara | .................... 375/347 |
| 6,137,843 A | * | 10/2000 | Chennakeshu et al. | ...... 375/340 |

(Continued)

FOREIGN PATENT DOCUMENTS

EP          0 951 091 A2       10/1999

(Continued)

OTHER PUBLICATIONS

Foschini, et al., "Simplified Processing for High Spectral Efficiency Wireless Communication Employing Multi-Element Arrays", IEEE Journal on Selected Areas in Communications, vol. 17, No. 11, Nov. 1999.

(Continued)

*Primary Examiner*—Ted M Wang
(74) *Attorney, Agent, or Firm*—Squire, Sanders & Dempsey L.L.P.

(57) ABSTRACT

A receiver is configured to receive a plurality of signals. The receiver includes receiving elements each of which is configured to receive a composite signal including at least some of the signals. The receiver receives the signals at the same time. The receiver also includes a processor configured to receive the receiving elements composite signal and providing an estimate of at least two of the signals. The processor is also configured to provide an estimate of a first one of the signals and to provide an estimate of a second one of the signals. The processor is configured, for each already determined estimate, to extend the estimate with a plurality of potential values. The estimate of the second one of the signals takes into account the estimate of the first signal and the estimate of the first signal is modified in dependence on the estimate of the second signal.

38 Claims, 7 Drawing Sheets

U.S. PATENT DOCUMENTS

| | | | |
|---|---|---|---|
| 6,304,618 B1 * | 10/2001 | Hafeez et al. | 375/341 |
| 6,782,036 B1 * | 8/2004 | Dowling et al. | 375/130 |
| 2001/0022820 A1 | 9/2001 | Zhengdi et al. | |
| 2002/0006122 A1 * | 1/2002 | Zeira | 370/335 |
| 2002/0114398 A1 * | 8/2002 | Lin et al. | 375/253 |
| 2002/0132600 A1 * | 9/2002 | Rudrapatna | 455/277.1 |
| 2003/0112887 A1 * | 6/2003 | Sang et al. | 375/285 |
| 2003/0112966 A1 * | 6/2003 | Halder et al. | 379/406.05 |
| 2003/0118177 A1 * | 6/2003 | Karakas et al. | 379/406.01 |

FOREIGN PATENT DOCUMENTS

| | | |
|---|---|---|
| EP | 1069722 A2 | 1/2001 |
| WO | WO 00/52845 | 9/2000 |

OTHER PUBLICATIONS

Li, et al., "Reduced-Complexity Detection Algorithms for Systems Using Multi-Element Arrays", IEEE, 2000.

Li, et al., "Effects of Iterative Detection and Decoding on the Performance of BLAST", IEEE, 2000.

* cited by examiner

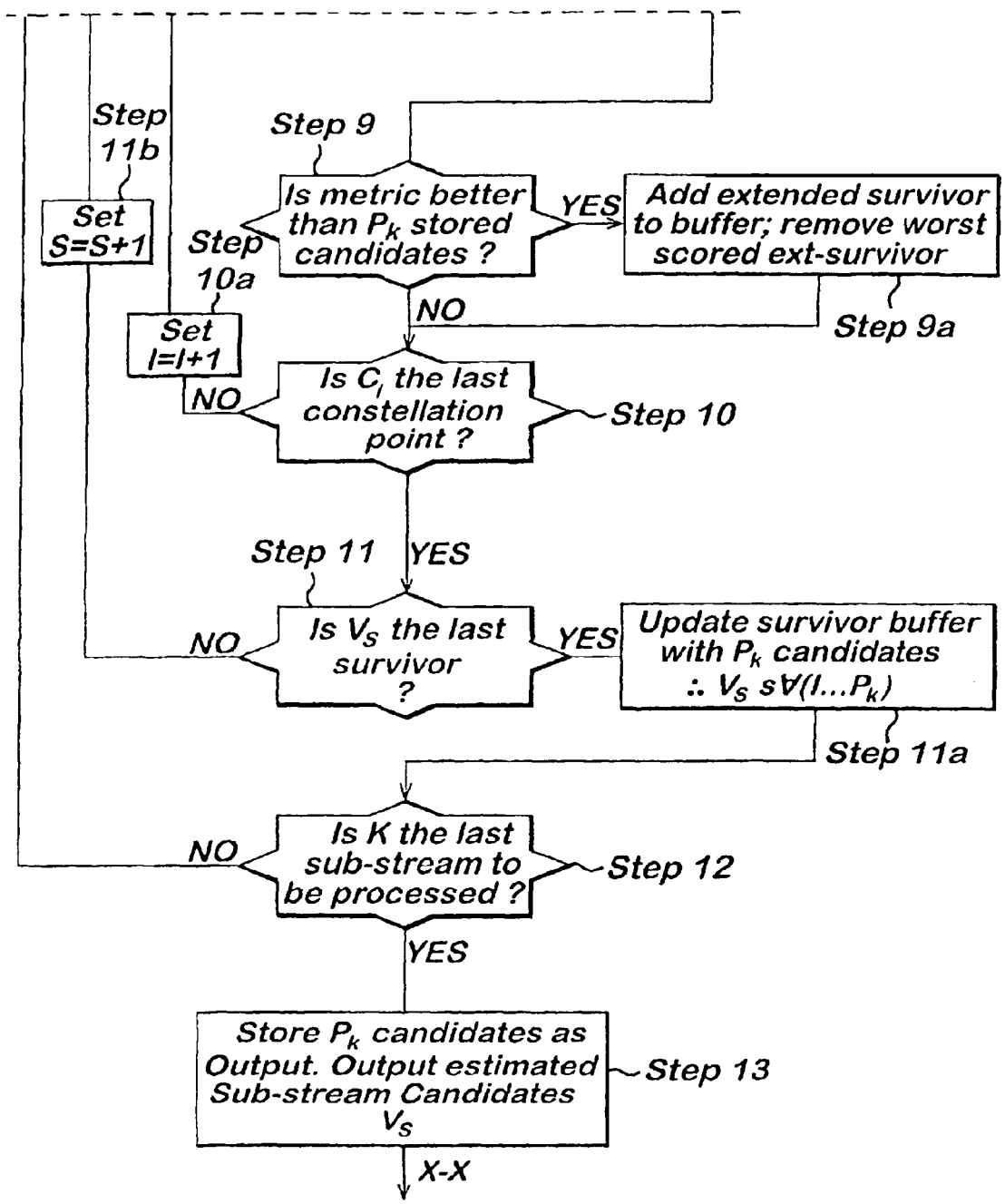
Fig. 5 (Contd.)

METHOD AND RECEIVER FOR RECEPTION OF A COMPOSITE SIGNAL

FIELD OF THE INTENTION

The present invention relates to a receiving method and receiver and in particular but not exclusively to a method and receiver for use in wireless communication system such as a cellular wireless system.

BACKGROUND OF THE INVENTION

Wireless cellular communication networks are known in which the area covered by the networks are divided into cells. Each cell is provided with a base station which is arranged to communicate with mobile stations or other user equipment in the cells associated with the base station.

In these known systems, a channel is allocated to one user. For example, in the case of the GSM (global system for mobile communications) standard, a user is allocated a given frequency band and a particular time slot in that frequency band. A single information stream from a single user can use that allocated frequency band and time slot. So-called third generation standards are currently being proposed which use code division multiple access (CDMA). In this proposed standard, a user is allocated a particular spreading code to define a channel.

In the currently proposed systems, a single user is allocated a channel as defined by the frequency band, time slot and/or spreading code in a particular cell. Different users may be allocated the same frequency, time slot and/or spreading code but in different cells.

It has been proposed to improve the capacity of a cellular system by using a spatially multiplexed system. In this proposed system, the data rate can be increased by transmitting independent information streams from different (but adjacent) antennas but using the same channel as defined by frequency, time slot and/or spreading code.

In order to successfully receive the different information streams which are transmitted in parallel, it is necessary that the receiving end also have a number of antennas. In practice, for such a system to work, the number of propagation paths for each signal needs to be relatively high, that is high enough to prevent the channel matrix H, the mathematical representation of the transmitted signals through space, from being singular. Typical conditions that lead to Rayleigh Fading, a time related model of the environment which incorporates fluctuations, and spacing of antennae of more than half a wavelength (for GSM with a carrier frequency of approximately 900 MHz, the wavelength is approximately 3.3 mm, and therefore the spacing of the antennae is required to be greater than 1.7 mm) are generally sufficient for non-singularity of the channel matrix.

At the receive end, the detection of the transmitted signals is complicated by the presence of a significant amount of cross talk. In particular, each receiving antenna will receive a linear combination of the transmitted signals.

Accordingly, in order to determine the signals which have been transmitted, each of these different signals need to be extracted from the received combined signal, decoded and interleaved.

It has been proposed to decode the received signals by using the maximum likelihood (ML) approach. This is a brute force method and works by testing every possible combination of substream symbols one by one to determine the one possible combination with the greatest likelihood. This algorithm is possible with some simple cases particularly where the number of parallel information streams is relatively small. However, if the number of streams is relatively large, there are problems associated with the use of this approach. In particular, the algorithm increases in complexity at an exponential rate as the number of parallel data streams increases.

Another method is the ordered successive interference cancellation (OSIC) algorithm. The OSIC algorithm attempts to extract each independent stream individually, by examining the received signals and ordering the independent data streams from highest to lowest signal to noise ratio. These estimates are then used to calculate the interference created by the current estimated data stream which is then used to filter the received signals. This effectively cancels the effect of the estimated data stream from the received signals. This is continued until all of the received signals contain nothing but background noise and all of the independent data streams are decoded.

The OSIC method and its related recoding methods are much simpler than the maximum likelihood approach. However, the OSIC method has the disadvantage that the error performance figures are not as good as the maximum likelihood method.

SUMMARY OF THE INVENTION

It is an aim of embodiments of the present invention to provide a method which provides a performance similar to that of the maximum likelihood approach but at the same time is much less complex.

There is provided according to the invention a receiver for receiving a plurality of signals at the same time, said receiver comprising: a plurality of receiving elements each of which is arranged to receive a composite signal including at least some of said plurality of signals; processing means for providing a estimate of at least two of said plurality of signals, said processing means being arranged to provide an estimate of a first one of said signals and then to provide an estimate of a second one of said signals, wherein said estimate of said second one of said signals takes into account the estimate of the first signal and the estimate of the first signal can be modified in dependence on the estimate of the second signal.

According to a second aspect of the invention there is provided a method for receiving a plurality of signals at the same time, said method comprising the steps: receiving at each of a plurality of receiving elements a composite signal including at least some of said plurality of signals; processing said received plurality of receiving elements' composite signal to provide a estimate of at least two of said plurality of signals; said processing step being arranged to provide an estimate of a first one of said signals and then to provide an estimate of a second one of said signals, wherein said estimate of said second one of said signals takes into account the estimate of the first signal and the estimate of the first signal can be modified in dependence on the estimate of the second signal.

Suitably the processing means may be arranged to provide an initial estimate of said plurality of signals, said processing means preferably using said initial estimate as a first value for said first and second estimates. The processing means may also be arranged to provide an estimate of at least three signals and the estimate of each successive signal takes into account the previously determined signal estimates.

The processing means may also be arranged to provide an estimate of at least three signals and any one or more of the previously determined estimated can be modified in dependence on a current signal estimate.

Preferably the processor means may be arranged to determine the order in which the signals are estimated, and further may determine the order in which the signals are estimated taking into account at least one of: received signal level and signal to noise ratio.

Preferably for each already determined estimate, the estimate is extended by extending the estimate with a plurality of potential values, wherein said potential values may comprise constellation points and said estimate is preferably extended by every possible constellation point.

Preferably the plurality of potential values comprise potential values for a currently estimated signal.

Preferably a metric is determined for the extended estimates, wherein at least some of said extended estimates may be discarded in dependence on the determined metric and wherein one or more existing estimates may be discarded if a determined metric is better than that of said one or more existing estimates.

Preferably the metric is based on a function of the currently determined estimates and the received signal, said function preferably being a squared Euclidean distance between said currently determined estimates and the received signal and may be calculated for a signal estimate at least partially from metric values stored during the calculation of a previously determined estimate.

Preferably said processor is arranged to treat those signals for which an estimate has not yet been determined as noise, and before determining any estimates preferably to calculate at least one of: the matrix product of the channel transfer function multiplied by itself; the squared length of the channel impulse response for at least one signal received by at least one receiving element; and an inner function defined by the received signal multiplied by the channel impulse response.

Preferably for each estimate the quantities $\|r-H(v_s+v_e)\|^2$, $\|r-Hv_s\|^2$, $2\Re\{(c_k-\hat{c}_k)^*(e_k^H H^H H v_s - h_k^H r)\}$, $|c_k-\hat{c}_k|^2 \|h_k\|^2$ are calculated.

BRIEF DESCRIPTION OF DRAWINGS

For a better understanding of the present invention and how the same may be carried into effect, reference will now be made by way of example only to the accompanying drawings in which.

DETAILED DESCRIPTION OF EMBODIMENTS OF THE PRESENT INVENTION

Figure 1:
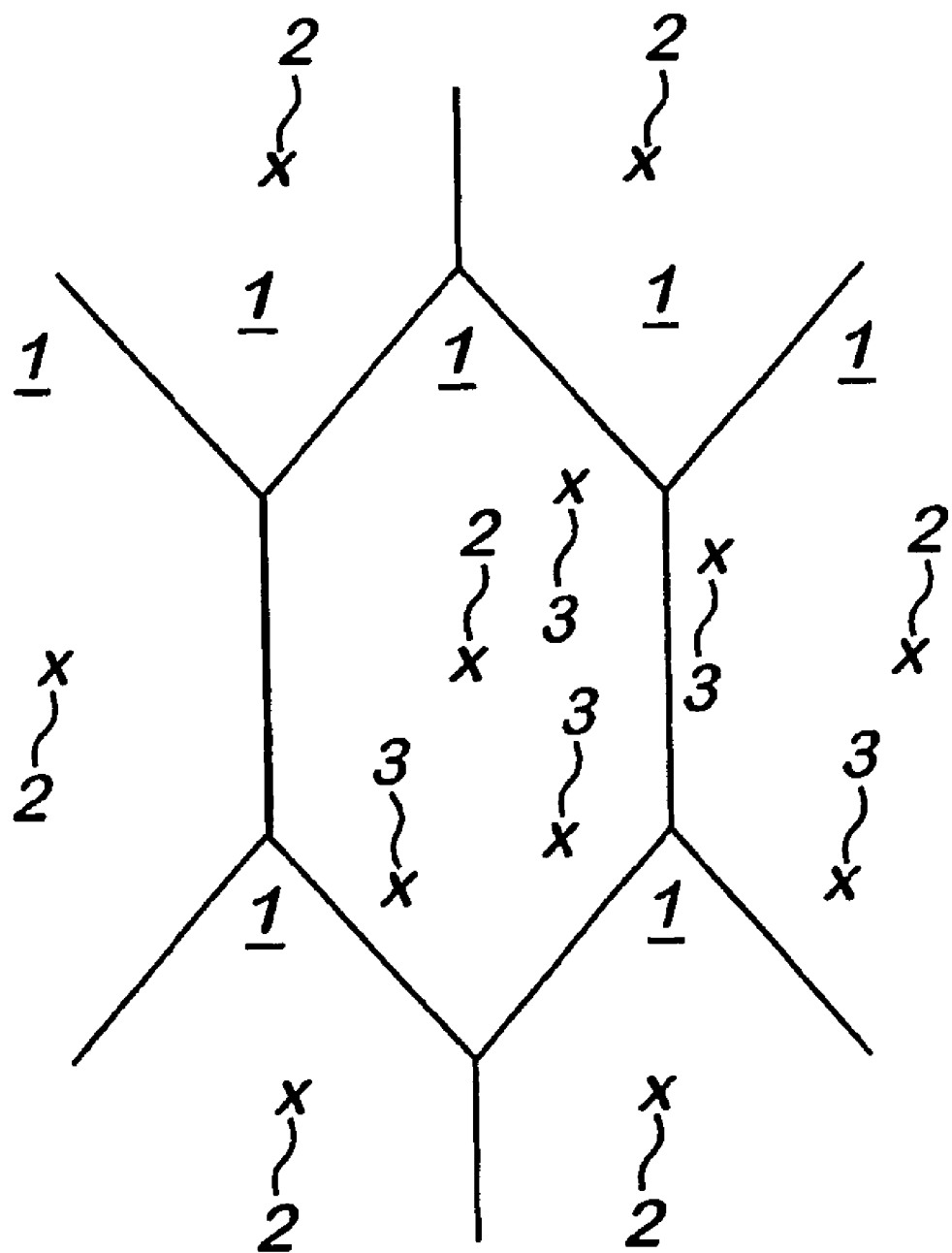
FIG. 1 shows a schematic view of a typical cell layout of a cellular network, in which embodiments of the invention can be implemented.

Reference is made to FIG. 1 which shows part of a cellular telecommunications network 4 in which embodiments of the present invention can be implemented. The area covered by the network is divided into a plurality of cells 1, one of which is shown in totality and the edges of six other are shown in FIG. 1. Each cell 1 has associated therewith a base station transceiver station 2. The base station transceiver 2 is arranged to communicate with mobile terminals or other user equipment 3 located in the cell associated with a base station. The cells may overlap at least partially or totally. In some systems, the cells may have different shapes to that illustrated. In some embodiments, the base stations may communication with mobile stations outside their associated cell.

Figure 2:
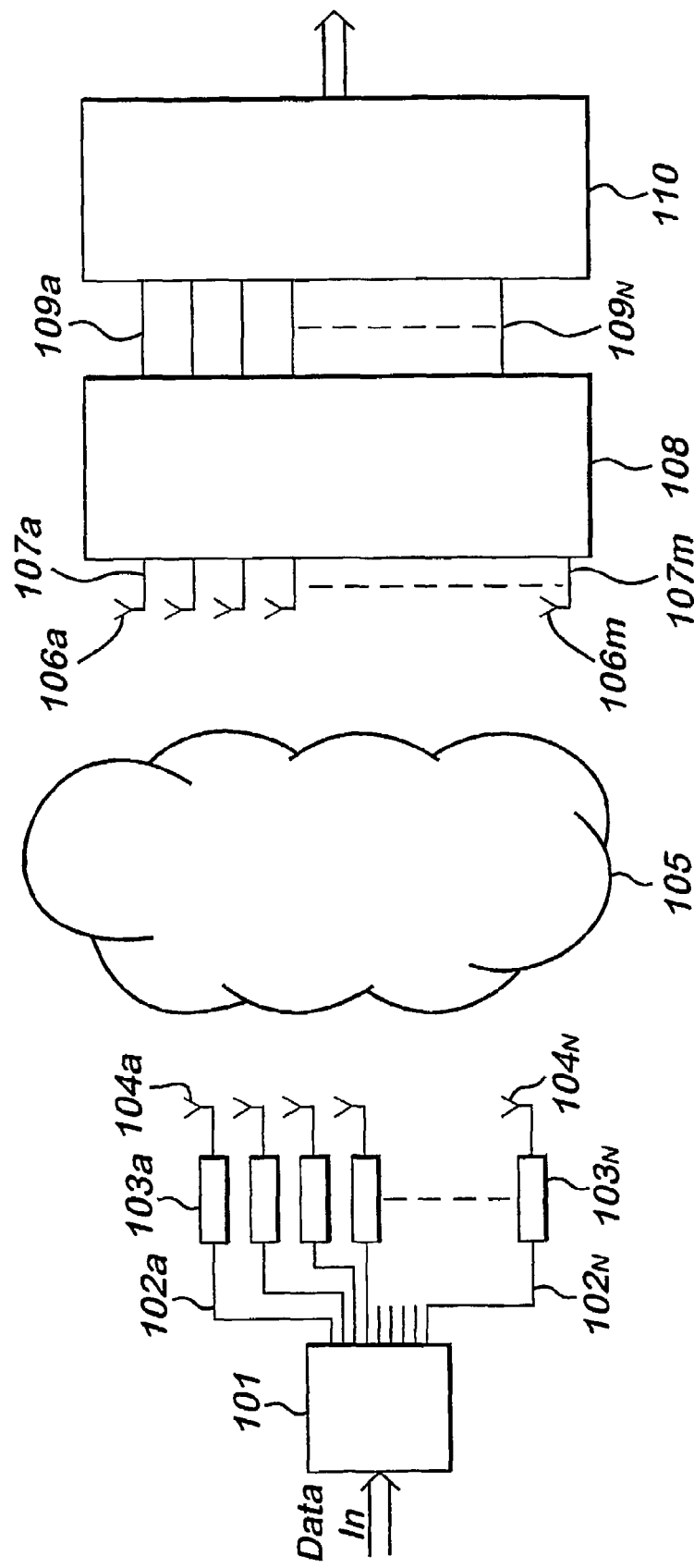
FIG. 2 shows a multiple antennae wireless communication system in which embodiments of the present invention can be implemented.

Reference is now made to FIG. 2 which shows the principles of a typical multi-element wireless communication system which may be incorporated into a cellular telecommunications network. The system is described in terms of transmitter and receiver data streams though both base station and mobile terminal users, operate in full duplex mode and thus each operate both as a transmitter and a receiver at the same time. Embodiments of the invention can be implemented in either or both base stations and user equipment such as mobile stations.

The transmitter element 1 of the system takes a data stream and divides it into a plurality of independent streams 102A-N. This is done by unit 101. The independent data streams may be different parts of data intended for one receiver or may be different bits of data intended for different receivers.

These independent data streams 102A-N are in the form of digital signals and are input to respective sets of up conversion circuitry 103A-N. The up conversion circuitry 103 converts the digital signals to the analogue domain and up converts the signals from the base band frequency to the appropriate radio frequency. It should be appreciated that the point at which the division of the signals occurs may differ to the described arrangement in alternative embodiments of the invention.

The up converted signals are output to respective antennas 104 and are transmitted at the same time. Thus the independent signals are transmitted on the same channel at the same time. The channel is defined by at least one of time, frequency and spreading code. In order to aid receiving each of the respective channels must send a training or pilot signal. This training pulse is send independent of the data stream and is required by the receiver to provide the estimated channel transfer model.

The signals transmitted pass through a radio environment to a receiver. As the signals pass through the environment, the signals each follow a number of different paths. This is known as multipath propagation.

The receiver element of the system comprises receiver antennas 106A-M. The number of receivers may be less than, equal to, or greater than the number of transmitters. The antennas 106 each receive all of the signals transmitted by the antennas 104 of the transmitter including multipath propagations of the signals. The signals received by each antenna are separately input to a signal processor 108. The signals which are input to the signal processor are in the digital domain and at the base band in preferred embodiments of the invention. Accordingly, in preferred embodiments of the invention the received signals may be down converted and converted from the analogue domain to the digital domain before being input into the signal processor. Alternate embodiments of the invention may process the signals in the analogue domain and/or at a radio frequency.

The function performed by the signal processor will be described in more detail hereafter. In broad terms, the signal processor estimates fed the signals into the originally sent separated signals. The estimated signals can then be decoded and/or further processed by entity 110 as is well known in the art.

Figure 3:
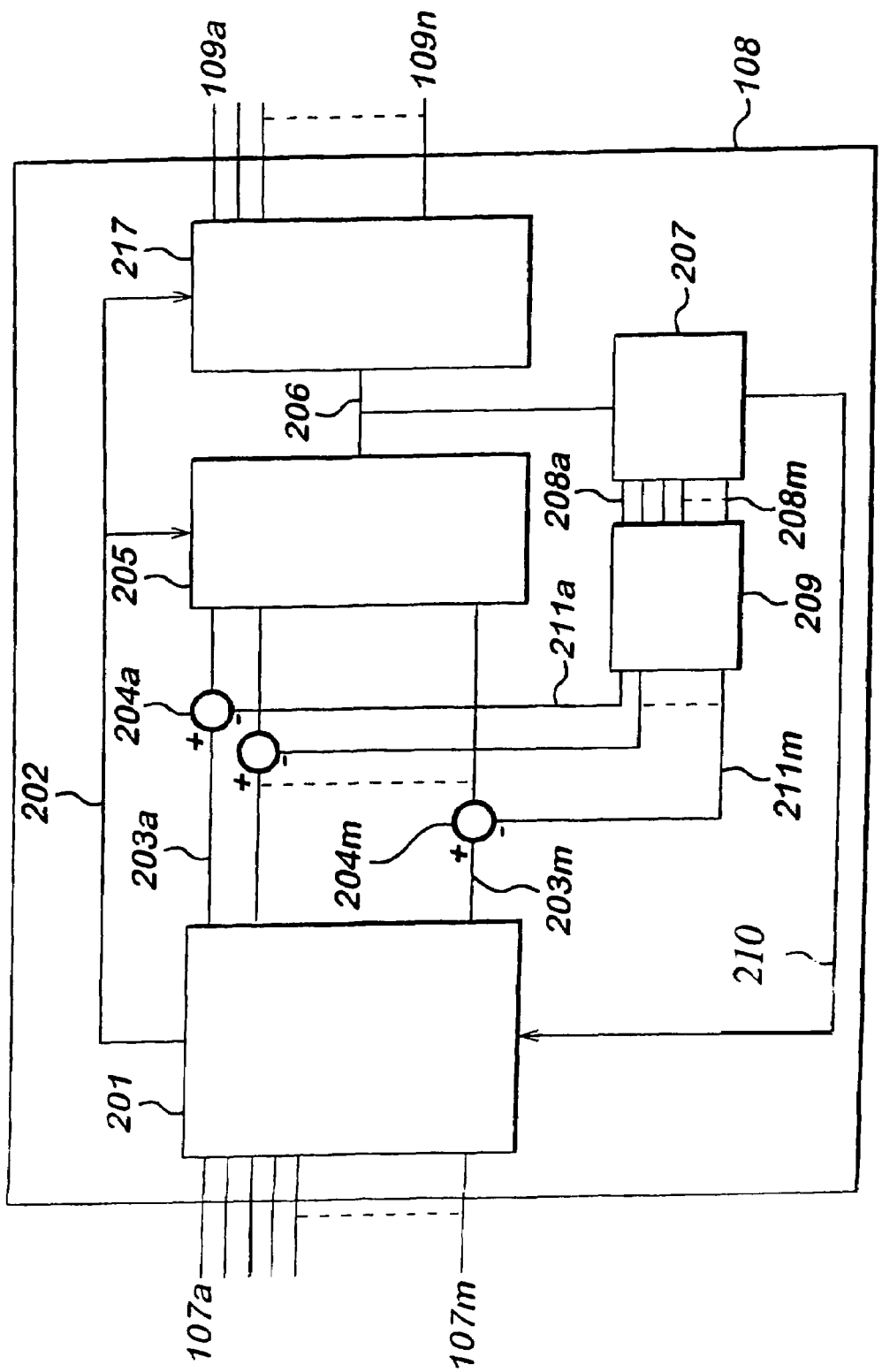
FIG. 3 shows schematically a known OSIC processor.

To assist in the explanation of embodiments of the present invention, reference is now made to FIG. 3 which shows in detail the method performed within a known OSIC processor. The known processor receives an input from the receiver channels 107A-M, which is input into a receiver buffer 201. The receiver buffer 201 outputs these received signals along respective data lines 203A-M. Each output forms one of two inputs to respective adders/subtractors 204. The respective adders/subtractors 204 receive their second input from an interference filter sum device 209, via respective signal lines 211A-M. The results from the adders/subtractors 204A-M are input into an estimator 205. The estimator 205 receives a secondary control input 202 from the receiver buffer and outputs a substream estimate to a substream buffer 217 and an interference filter generator 207. The interference filter generator 207 produces an output on the line 208A-M which is input to the interference filter sum device 209. A second output 210 from the interference filter generator 207 is preferably used to control the receive buffer 201. The substream buffer 217 also receives the secondary control line 202 and supplies outputs 109A-N, which in this embodiment are the estimates of the received signals.

The known processor receives the inputs 107A-107M from the antenna array which are received and stored temporarily in the receiver buffer 201. This buffer is also used to preprocess the received inputs channels in order to determine in which order the substreams will be decoded. This preprocessing involves rearranging the sequence such as the training data used to calculate the transfer function. The term substream is used in this document to define one of the plurality of signals transmitted 102A-N. The known processor then attempts to decode and estimate each substream one at a time. In order to do this it initially forms an estimate of the signal to noise ratio of each of the substreams based on training signal information, and then orders the substreams in order of signal to noise ratio starting from the highest and ending in the lowest. The receiver buffer in this embodiment then selects the estimator 205 to provide an estimate of the constellation point for the first substream, the substream with the highest signal to noise ratio. This estimate is then passed to the substream buffer and also the interference filter generator 207. The interference filter generator 207, with prior knowledge of the characteristics of the wireless multipath environment, determined by a sequence of training signals, calculates the estimated values that would be received on received channels 1-M if that substream transmitter alone had transmitted that estimated constellation point. These estimated received interference values are then passed to a filter summing device 209 which calculates and stores the sum of all the decoded substream interference cancellation estimates, the output of which is then fed back to the adder/subtractor devices 204A-M which is then used in order to null or cancel the signals from the received and previously estimated substreams. The interference filter generator also outputs a signal to the receiver buffer indicating that the processor can progress to the next substream estimate. The receiver buffer 201 outputs the same receiver channels 203A-M but instructs the estimator to estimate the next substream, with the next highest signal to noise ratio. The input to the estimator supplied by the adder/subtractor devices 204A to 204M is therefore now a combination of the signals 107A-M buffered in the receiver buffer, with the interference cancellation values formed by the interference filter generator from previously estimated substreams.

In other words, the processor estimates the received constellation point value for each of the substreams one at a time, with the values used to estimate the next substream consisting of the data received by the receivers minus the estimated received data formed from previously decoded substreams. The output from the substream buffer comprises the estimates of these N substreams.

FIG. 3 shows in detail the major drawback of the known processor. The substream estimator 205 produces a single output estimated value for each of the substreams, which is then fed into an interference filter generator 207. For communication systems operating in high signal to noise ratios this is not critical, but in operating situations with poor signal to noise ratio each estimate, which carries a high probability of incorrect estimation, the method will produce an incorrect interference filter, which will then further lead to further errors caused by the errors in the input to the next substream estimation step.

A further disadvantage with the known processor is that the input from the combination of received signals and interference filter into the substream estimator changes completely for every substream. This prevents any preprocessing from being carried out, and requires each substream to make full parameter calculations. Metric preprocessing is a process where the parts of the metric are calculated and stored, so that it is not necessary to calculate the whole of the metric for every estimate. These parameter estimations within the known processor typically require vector and matrix estimates.

Figure 4:
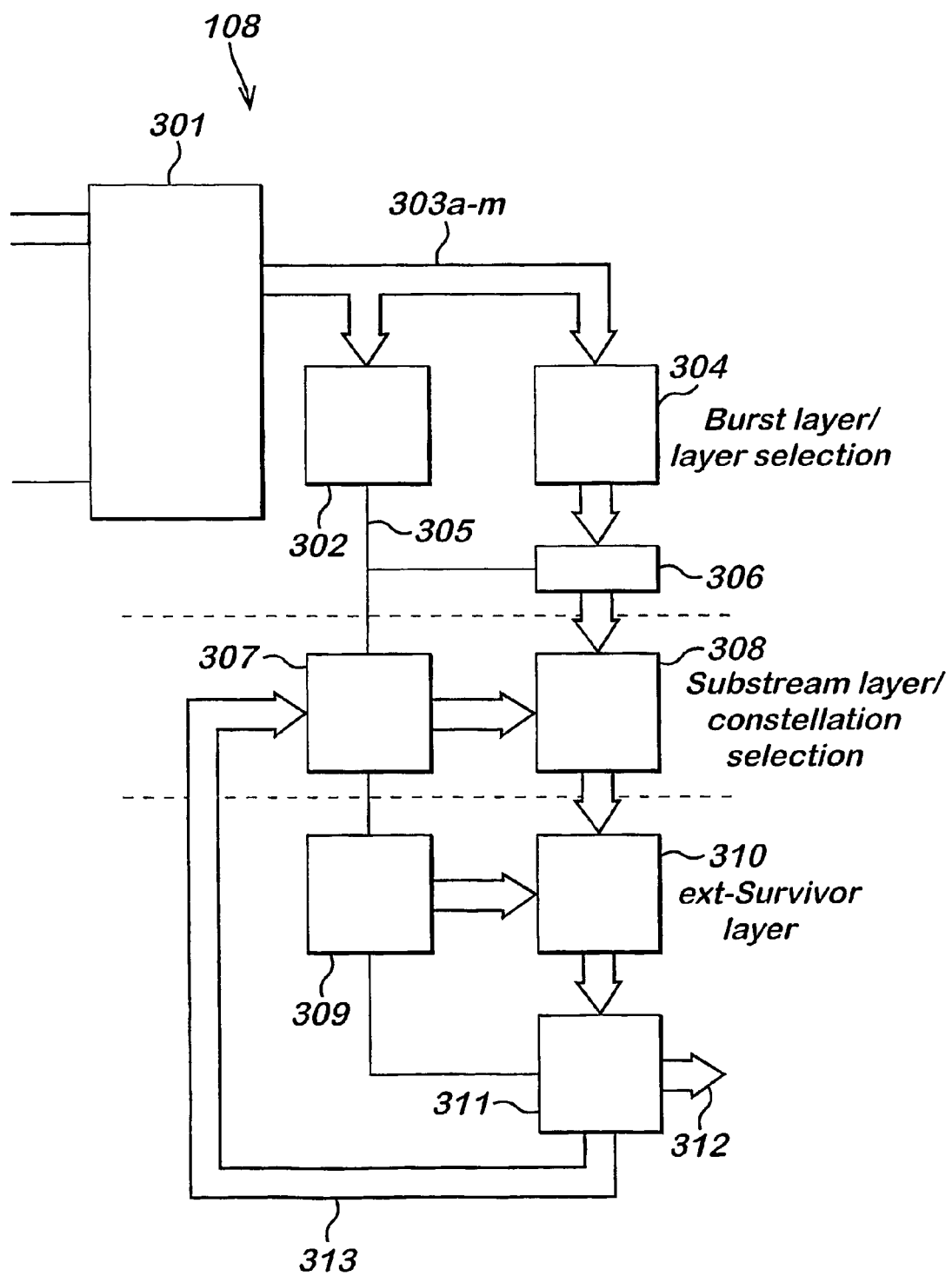
FIG. 4 shows a block diagram details of a signal processor embodying the present invention.
Figure 5:
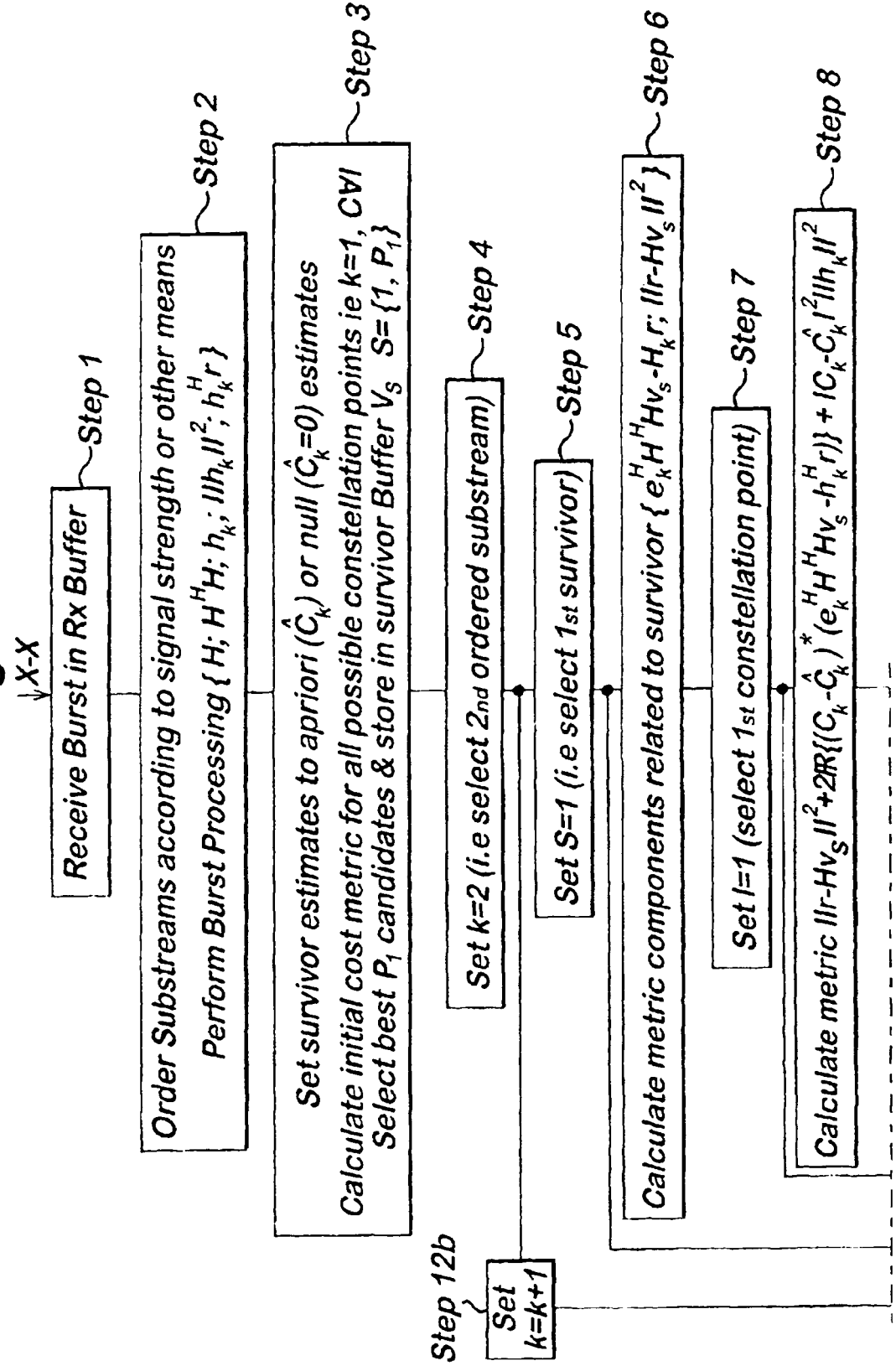
FIG. 5 shows a flow diagram of the method performed by the signal processor of FIG. 4.

Reference is now made to FIG. 4, which schematically shows a processor embodying the present invention. The input signals 107A to 107M are buffered in a receiver. The receive buffer is connected via a data bus to a substream ordering device 302 and a burst processor 304. The substream ordering/layer control 302 is connected via a control bus 305 to both a burst buffer 306 and a survivor buffer 307. The burst processor 304 is connected via a data bus to the burst buffer 306. The burst buffer 306 selectively outputs data to the input of the survivor processor 308. The survivor buffer 307 also selectively outputs data to the survivor processor 308. The survivor processor 308 outputs values to the input of the extended survivor processor 310. The survivor buffer 307 may also be connected to a constellation buffer 309 via a control bus. The constellation buffer 309 selectively outputs data to the extended survivor processor 310. The extended survivor processor 310 outputs its data to a metric buffer 311. The metric buffer 311 may also be connected to the constellation buffer 309 via a control bus. The metric buffer 311 has an output directly connected to the output estimated substream lines 109A to 109N (see FIG. 2) and also to the survivor buffer 307. The method performed by the processor will be discussed in more detail hereafter.

In embodiments of the present invention the receive signal is processed one substream at a time, as in the same manner as the known processor. However unlike the known processor embodiments of the present invention may start processing each burst with an apriori estimate for all of the substreams to be processed already having been provided. This apriori estimate may be calculated from a range of apriori information such as unquantized MMSE estimates or from a forward error control decoder (e.g. soft-viterbi decoder) in a iterative receiver configuration. During processing these soft substream estimates are sequentially replaced by the hard substream estimates. Also unlike the known processor a plurality of these estimates is stored during each substream estimation step. The known algorithm retains only one estimate throughout the whole processing cycle, which is the reason behind the suboptimal error performance. In embodiments of the present invention at each substream estimation every survivor (a composite estimate of all the previous hard estimated substreams and of apriori soft estimated substreams) is extended by augmenting or extending the survivor with every possible constellation symbol, while removing the effect of the soft substream estimate, or in other words each possible candidate constellation symbol in turn replaces the soft apriori estimate. Metrics of the extended survivors are then calculated, the extended survivors are sorted according to their metric score and the best matching sequences are kept and used as the new survivors for processing the next substream.

If no such initial soft apriori estimates are possible or available then the initial survivor is set to null. Subsequent extension to any survivor consists of augmenting the survivor with every possible constellation symbol. The soft apriori estimates are chosen in order to attempt to cancel the interference created by the remaining unprocessed substreams. Thus without the soft apriori estimates the remaining substreams are treated as noise.

In the preferred embodiment the squared Euclidian distance between the partially regenerated signal and received signal is used as a metric, to determine the suitability of the candidate symbol. In other words a survivor is one of a number of estimates of the transmitted substreams, containing the values of the ordered hard estimated substreams up to but not including the substream being processed, and if an apriori estimate exists also containing the apriori soft estimates for the substreams from the current substream being processed to the last substream to be processed. An extended survivor is a survivor combined with one of the signal constellation points allowable for the substream being processed, and if an apriori estimate is available the apriori soft estimate removed. Then extended survivor thus forming the basis of a hard estimate of the ordered transmitted substreams up to and including the substream being processed using a scoring system or metric in the chosen embodiment.

The metric is a simple scoring method in order to compare and rank the various extended survivors.

The equation below shows the metric of an embodiment of the invention, an efficient way to calculate the distance of an extended survivor recursively using the distance of the non-extended survivor.

$$\|r - H(v_s + v_e)\|^2 = (r - H(v_s + v_e))^H (r - H(v_s + v_e))$$
$$= \|r - Hv_s\|^2 + 2\Re \{(Hv_e)^H(Hv_s - r)\} + \|Hv_e\|^2$$
$$= \|r - Hv_s\|^2 + 2\Re \{(c_k - \hat{c}_k)^*(e_k^H H^H Hv_s - h_k^H r)\} + |c_k - \hat{c}_k|^2 \|h_k\|^2$$

Here $H=[h_1 \ h_2 \ldots h_N]$ is the channel transfer matrix, R is the receive signal, $V_s$ is one survivor at the time of processing the substream k, and is defined as $V_s=[c_1 \ c_2 \ldots c_{k-1} \ \hat{c}_k \ \hat{c}_{k+1} \ldots \hat{c}_N]^T$, in other words as the vector containing previously decoded substreams ($c_1 \ c_2 \ldots c_{k-1}$) and of apriori estimated substreams ($\hat{c}_k \ \hat{c}_{k+1} \ldots \hat{c}N$), $v_e$ is equal to $(c_k-\hat{c}_k)^*e_k$—an extension for the survivor based upon the soft apriori estimate, where $c_k$ is a constellation point transmitted from antenna k and $e_k$ is equal to the natural base vector in $R^m$ (ie the natural base vector for the substream value of the M dimensional space).

In order to decrease the computation load of storing and processing the multiple estimates (survivors) the metric computation is performed in three phases, which are stored in and processed in the present invention's preferred embodiment, the burst processor 304, survivor processor unit 308 and the extended survivor processor unit 310. The burst processor 304 receives the data from the receiver buffer 301 and calculates for every burst of data the matrix product $H^H H$ (ie the matrix square of the transfer function), the squared length $\|h_k\|^2$ and the inner products $h^H_k r$. These values do not depend on the survivor nor its extensions and therefore only need to be calculated for every burst. These values are then stored in the burst buffer 306.

The next level of processing and storage depends not only upon the received signal but also upon the current tested survivor. The survivor processor 308 therefore takes inputs from the burst buffer 306 and the survivor buffer 307 and for each survivor calculates the quantity $e_k^H H^H H v_s - h^H_k r$. Since $e_k$ is a natural base vector, the product $e_k^H H^H H$ is just the $k^{th}$ row from the matrix $H^H H$. The value $\|r-Hv_s\|$ can also be found during this step as this value is equal to the full metric value for the current survivor, the value of which would have been calculated during the previous substream calculation. The only situation when this is not is during the initial substeam calculation, as there are no stored metric values. In this situation the value of $\|r-Hv_s\|$ can be set to zero. As the present invention compares a series of relative values in ranking the extended survivors and the metric element generated by the initial survivor (comprising of either the apriori soft estimate or a null value) would produce a constant value, this value added to all of the initial extended survivor metrics would not affect the ranking of the extended survivor candidates.

To form the extension or augmentation of the survivor it is required only to calculate half of a complex multiplication and perform two real additions in order to complete the calculation of the metric.

The ordering of substreams is important in preferred embodiments of the invention. One practical metric on which the ordering can be based is the signal strength, because it is easily computed from the matrix $H^H H$ and it does not degrade the error performance. An alternate embodiment may order the substreams according to the signal to noise ratio, which can also be computed from the same matrix value.

Figure 6:
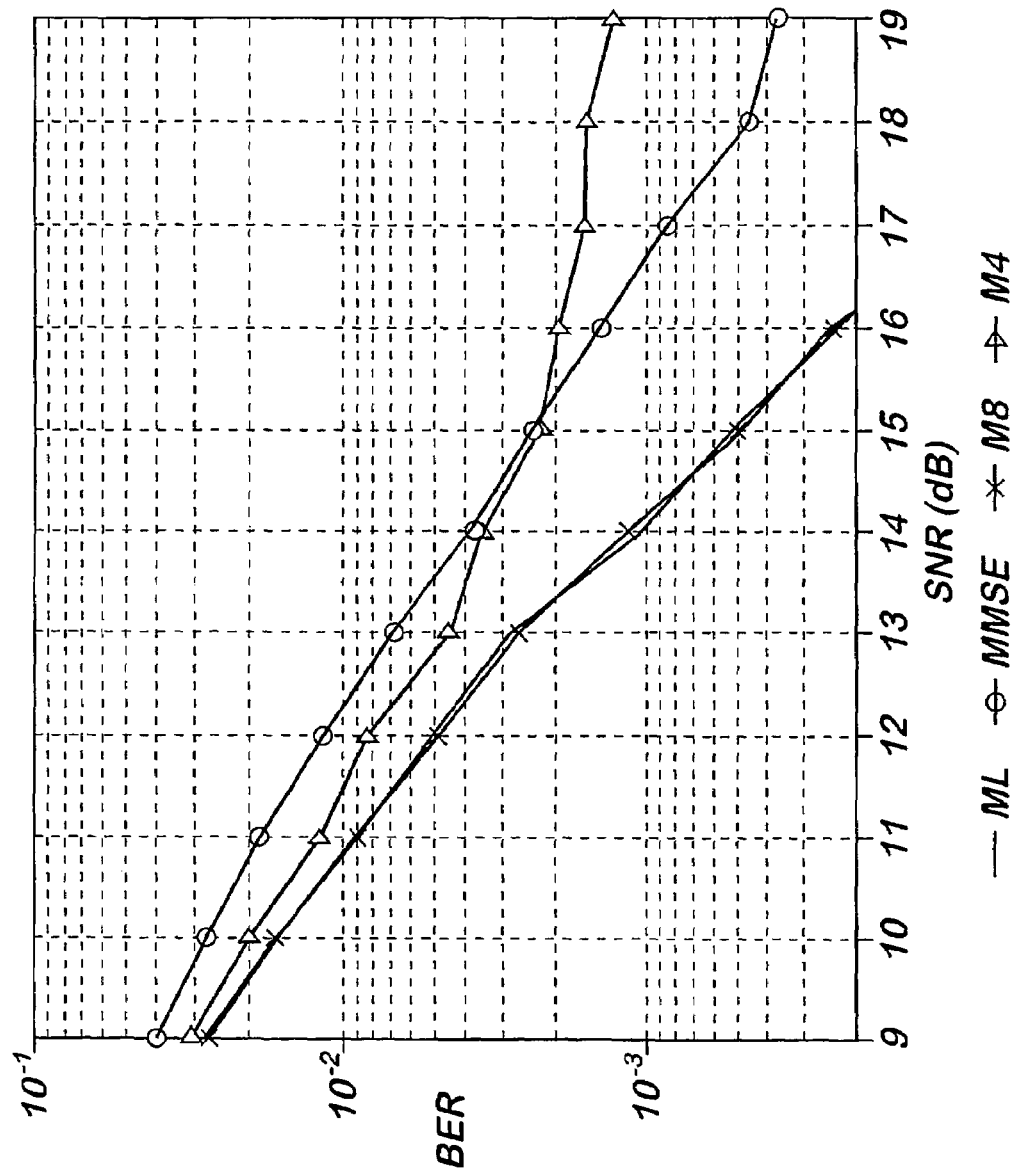
FIG. 6 shows the performance of various processing techniques including embodiments of the present invention.

Reference is now made to FIG. 6 which shows a flow diagram of the method performed by the signal processor of FIG. 4 in detail.

The first step, step 1, is the reception of a data burst from all of the antennas into the receiver buffer 301. The receiver buffer 301 holds the values received from the M receive channels. The received values are then passed to the substream ordering device 302 and burst processor 304.

The second step, step 2, occurs within the substream ordering device 302 which orders the received substreams according to the signal strength or other means as discussed above. In step 2 the first set of values $\{H^H H, \|h_k\|^2, h^H_k r\}$ are calculated in the burst processor and as already discussed are independent of the substream decoding.

The third step, step 3, is an initialisation step. The survivor estimates are set to an apriori or soft estimate, this is carried out in an attempt to reduce the interference from the unprocessed substreams. If no information is available to calculate an apriori estimate—ie all of the possible candidates are equally probable then a null survivor estimate is created. This apriori survivor estimate is passed to the survivor processor 308. The output from the survivor processor is then passed to the extended survivor processor 310 where the initial metric (Equation 1) is calculated for each extended survivor. These metrics are passed one-by-one to the metric buffer which selects the best $P_1$ candidates, and once all the constellation points are tested the best $P_1$ candidates, and their metric values, are passed to the survivor buffer 307.

Step 4 initialises the substream loop which this preferred embodiment resides within the controller 302. In other words the substream controller is now arranged to decode the second of the ordered substreams. This step also activates the burst buffer to release selected outputs to the survivor processor 308, and also activates the survivor buffer 307.

The next step, step 5, initialises the survivor loop. The survivor counter is set to 1, therefore selecting the first survivor. This first survivor is output to the survivor processor 308 from the survivor buffer.

Step 6 details the calculation and presentation of the metric components which are related purely to the survivor—ie $\|r-Hv_s\|^2$—which is the value currently stored along with the survivor in the survivor buffer, $e_k^H H^H H v_s - h^H_k r$. The survivor metric components are output to the extended survivor processor 310.

The next step, step 7, involves the initialisation of the constellation loop for this substream decoding loop/survivor loop. The constellation counter is set to output the first constellation point, which within this embodiment is stored the constellation buffer itself. This first estimated constellation point is passed to the extended survivor processor 310, and also passes a control signal to the metric buffer to expect a full metric value.

The next step, step 8, involves the calculation of the full metric based on the inputs from the survivor processor. The full metric is passed to the metric buffer 311.

Step 9 features the comparison step between the current calculated metric passed from the extended survivor processor 310, and the current $P_k$ stored candidates. Within this embodiment the metric buffer stores the value of the metric and also its associated extended survivor. If the current calculated metric is better than any of the $P_k$ stored candidates then the extended survivor is added to the buffer, along with its associated metric score, with the worst stored extended survivor and associated metric related removed from the buffer. If the current calculated metric is not better than any of the $P_k$ stored candidates then the current calculated metric is discarded. In both cases the algorithm progresses to the next step 10.

Step 10 is a test to determine whether or not all of the constellation points have been used to extend the survivor. If the current tested constellation point is the last of the constellation points to be tested then the algorithm progresses to step 11. If the correct tested constellation point is not the last constellation point in the series to be tested the constellation point counter is increased by one (ie the next constellation point is selected), and that constellation point is passed to the extended survivor processor 310, and the algorithm reverts to step 8. This in other words completes the constellation loop.

Step 11 is the test that the current survivor being tested is the last in the series of survivors to be tested. If the current survivor being tested is the last in the series then the metric buffer updates the survivor buffer with the best $P_k$ candidates (where k is the current substream being decoded, and $P_k$ the number of candidates being stored for that respective substream decoding), and their respective metric scores (which can be reused as the next substream's value $\|r-Hv_s\|^2$. At this point the algorithm then progresses to step 12. If the current survivor being tested is not the last in the series of survivors then the survivor counter is incremented, which causes the next survivor to be passed to the survivor processor 308. The algorithm then loops back to step 6. This step 11 is the end of the survivor loop.

Step 12 tests to see whether or not the current substream being processed and decoded is the last substream to be processed in the series. If the current substream is not the last in the series to be decoded or processed then the substream counter is incremented, and the next substream is decoded. The algorithm in this case loops back to step 5 within which the first survivor of the new substream to be decoded is selected. If this substream correctly being decoded is the last in the substream series to be decoded then the algorithm proceeds to step 13. Thus step 12 completes the layer loop.

Step 13, the output step, examines the results stored within the metric buffer. As these results contain a set of estimates for all of the substreams, all that is required within this embodiment is to select the full survivor which has the best metric score. This may be output on the output lines 109A to 109M. Thus in other words, the output step, after processing the last substream selects the best of the extended survivors stored within the metric buffer. This full survivor contains the best estimate for all N substreams and is output.

An alternative embodiment for this system uses different numbers of survivors for each different decoded substream, ie $P_1$ is not necessarily equal to $P_2$ which is in turn not necessarily equal to $P_k$. By using a different number of survivors for each different decoded substream a complexity/performance trade off can be made by selecting the number of survivors independently for each layer. This complexity/performance trade off can be controlled by the layer ordering and layer control systems when the signal to noise ratios of the received signals are particularly poor.

Reference is now made to FIG. 6 which shows a comparison of the uncoded bit error rate (BER) performance of the various algorithms for the 4×4 case with quadrature phase shift keying modulation (QPSK). From the graph it can be seen that the uncoded BER performance of the invention embodiments M4 and M8, which are the best 4 and best 8 estimates respectively for all substream estimates as a basis of survivor propagation, perform significantly better than the MMSE (Enhanced Ordered Successive Interference Cancellation (OSIC) method) detection rates for low signal to noise ratios. It can also be seen that increasing the number of survivor candidates stored does not increase the computational complexity significantly, as can be seen in

| M | add | Mpy |
|---|-----|-----|
| 4 | 500 | 550 |
| 8 | 800 | 850 |

A further alternate embodiment removes the limiting condition that only the best $P_k$ stored candidates are kept within the metric buffer. By making the constraint $P_k$ very large it is not necessary to sort the metric values as none of the extended survivors are ever removed or discarded. Removing this constraint produces the result which is equivalent to the maximum likelihood calculations but without the computational complexity of the brute force maximum likelihood detection algorithms.

Whilst preferred embodiments of the present invention have been described in the context of a cellular communication system, embodiments of the present invention can be used in any other suitable wireless communication system.

Embodiments of the present invention can be implemented with frequency division multiple access systems, time division multiple access systems, spread spectrum multiple access systems such as code division multiple access systems, or systems using any two or more of these techniques.

Embodiments of the present invention can be used in conjunction with, for example, the GSM standard, any of the proposed third generation standards using CDMA or the like.

The invention claimed is:

1. An apparatus, comprising:
   a plurality of receiving elements each of which is configured to receive a composite signal including at least some of a plurality of signals, wherein the apparatus receives said plurality of signals at the same time; and
   a processor configured to receive said plurality of receiving elements composite signal and providing an estimate of at least two of said plurality of signals, said processor is configured to provide an estimate of a first one of said signals and to provide an estimate of a second one of said signals, wherein said processor is configured, for each already determined estimate of at least one of the estimate of the first one of said signals and the estimate of the second one of said signals, to extend each of the at least one already determined estimate with a plurality of potential values, wherein said estimate of said second one of said signals takes into account the estimate of the first signal and the estimate of the first signal is modified in dependence on the estimate of the second signal.

2. The apparatus as claimed in claim 1, wherein said processor is configured to provide an initial estimate of said plurality of signals, said processor using said initial estimate as a first value for said first and second estimates.

3. The apparatus as claimed in claim 1, wherein said processor is configured to provide an estimate of at least three signals and the estimate of each successive signal takes into account the previously determined signal estimates.

4. The apparatus as claimed in claim 1, wherein said processor is configured to provide an estimate of at least three signals and any one or more of the previously determined estimated can be modified in dependence on a current signal estimate.

5. The apparatus as claimed in claim 1, wherein said processor is configured to determine the order in which the signals are estimated.

6. The apparatus as claimed in claim 5, wherein said processor is configured to determine the order in which the signals are estimated taking into account at least one of received signal level and signal to noise ratio.

7. The apparatus as claimed in claim 1, wherein said potential values comprise constellation points.

8. The apparatus as claimed in claim 7, wherein said estimate is extended by every possible constellation point.

9. The apparatus as claimed in claim 1, wherein said plurality of potential values comprise potential values for a currently estimated signal.

10. The apparatus as claimed in claim 1, wherein a metric is determined for the extended estimates.

11. The apparatus as claimed in claim 10, wherein at least some of said extended estimates are discarded in dependence on the determined metric.

12. The apparatus as claimed in claim 10, wherein one or more existing estimates are discarded if a determined metric is better than that of said one or more existing estimates.

13. The apparatus as claimed in claim 10, wherein said metric is based on a function of the currently determined estimates and the received signal.

14. The apparatus as claimed in claim 13, wherein said function is a squared Euclidean distance between said currently determined estimates and the received signal.

15. The apparatus as claimed in claim 1, wherein said processor is configured to treat those signals for which an estimate has not yet been determined as noise.

16. The apparatus as claimed in claim 1, wherein the processor is configured, before determining any estimates to calculate at least one of:
   the matrix product of the channel transfer function multiplied by itself;
   the squared length of the channel impulse response for at least one signal received by at least one receiving element; and
   an inner function defined by the received signal multiplied by the channel impulse response.

17. The apparatus as claimed in claim 1, wherein said receiving elements comprise antennas.

18. An apparatus, comprising:
   a plurality of receiving elements each of which is configured to receive a composite signal including at least some of a plurality of signals, wherein the apparatus receives said plurality of signals at the same time; and
   a processor configured to receive said plurality of receiving elements composite signal and providing an estimate of at least two of said plurality of signals, said processor is configured to provide an estimate of a first one of said signals and to provide an estimate of a second one of said signals, wherein said processor is configured, for each already determined estimate of at least one of the estimate of the first one of said signals and the estimate of the second one of said signals, to extend each of the at least one already determined estimate with a plurality of potential values, wherein said estimate of said second one of said signals takes into account the estimate of the first signal and the estimate of the first signal is modified in dependence on the estimate of the second signal, wherein a metric is determined for the extended estimates and wherein said metric is calculated for a signal estimate at least partially from metric values stored during the calculation of a previously determined estimate.

19. An apparatus, comprising:
   a plurality of receiving elements each of which is configured to receive a composite signal including at least some of a plurality of signals, wherein the apparatus receives said plurality of signals at the same time; and
   a processor configured to receive said plurality of receiving elements composite signal and providing an estimate of at least two of said plurality of signals, said processor is configured to provide an estimate of a first one of said signals and to provide an estimate of a second one of said signals, wherein said processor is configured, for each already determined estimate of at least one of the estimate of the first one of said signals and the estimate of the second one of said signals, to extend each of the at least one already determined estimate with a plurality of potential values, wherein said estimate of said second one of said signals takes into account the estimate of the first signal and the estimate of the first signal is modified in dependence on the estimate of the second signal, wherein for each estimate, quantities $$\|r-H(v_s+v_e)\|^2, \|r-Hv_s\|^2, 2\Re\{(c_k-\hat{c}_k)^*(e_k^H Hv_s - h_k^H r)\}, |c_k-\hat{c}_k|^2\|h_k\|^2$$

are calculated.

20. A method, comprising:
   receiving a plurality of signals at the same time;
   receiving at each of a plurality of receiving elements a composite signal including at least some of said plurality of signals; and
   processing said composite signal of each of said received plurality of receiving elements to provide an estimate of at least two of said plurality of signals,
   said processing comprising
      providing an estimate of a first one of said signals and providing an estimate of a second one of said signals wherein during said processing, and
      extending each already determined estimate of at least one of the estimate of the first one of said signals and the estimate of the second one of said signals, with a plurality of potential values, wherein said estimate of said second one of said signals takes into account the estimate of the first signal and the estimate of the first signal modified in dependence on the estimate of the second signal.

21. A method as claimed in claim 20, wherein said processing further comprises
providing an initial estimate of said plurality of signals, said processing using said initial estimate as a first value for said first and second estimates.

22. A method as claimed in claim 20, wherein said processing further comprises
providing an estimate of at least three signals and the estimate of each successive signal taking into account the previously determined signal estimates.

23. A method as claimed in claim 20, wherein said processing further comprises
providing an estimate of at least three signals and any one or more of the previously determined estimates modified in dependence on a current signal estimate.

24. A method as claimed in claim 20, wherein said processing further determines an order in which the signals are estimated.

25. A method as claimed in claim 24, wherein said processing further comprises
determining the order in which the signals are estimated taking into account at least one of received signal level and signal to noise ratio.

26. A method as claimed in claim 20, wherein said potential values comprise constellation points.

27. A method as claimed in claim 26, wherein said estimate is extended by every possible constellation point.

28. A method as claimed in claim 20, wherein said plurality of potential values comprise potential values for a currently estimated signal.

29. A method as claimed in claim 20, wherein a metric is determined for the extended estimates.

30. A method as claimed in claim 29, further comprising:
discarding at least some of said extended estimates in dependence on the determined metric.

31. A method as claimed in claim 29, further comprising:
discarding one or more existing estimates if a determined metric is better than that of said one or more existing estimates.

32. A method as claimed in claim 29, wherein said metric is based on a function of the currently determined estimates and the received signal.

33. A method as claimed in claim 32, wherein said function is a squared Euclidean distance between said currently determined estimates and the received signal.

34. A method as claimed in claim 20, wherein the processing treats those signals for which an estimate has not yet been determined as noise.

35. A method as claimed in claim 20, wherein the processing further comprises, prior to the determining of any estimates, calculating at least one of:
the matrix product of the channel transfer function multiplied by itself;
the squared length of the channel impulse response for at least one signal received by at least one receiving element; and
an inner function defined by the received signal multiplied by the channel impulse response.

36. A method, comprising:
receiving a plurality of signals at the same time;
receiving at each of a plurality of receiving elements a composite signal including at least some of said plurality of signals; and
processing said composite signal of each of said received plurality of receiving elements to provide an estimate of at least two of said plurality of signals,
said processing comprising
providing an estimate of a first one of said signals and providing an estimate of a second one of said signals wherein during said processing, and
extending each already determined estimate of at least one of the estimate of the first one of said signals and the estimate of the second one of said signals with a plurality of potential values,
wherein said estimate of said second one of said signals takes into account the estimate of the first signal and the estimate of the first signal modified in dependence on the estimate of the second signal, wherein a metric is determined for the extended estimates and wherein said metric is calculated for a signal estimate at least partially from metric values stored during the calculation of a previously determined estimate.

37. A method, comprising:
receiving a plurality of signals at the same time;
receiving at each of a plurality of receiving elements a composite signal including at least some of said plurality of signals; and
processing said composite signal of each of said received plurality of receiving elements to provide an estimate of at least two of said plurality of signals,
said processing comprising
providing an estimate of a first one of said signals and providing an estimate of a second one of said signals wherein during said processing, and
extending each already determined estimate of at least one of the estimate of the first one of said signals and the estimate of the second one of said signals with a plurality of potential values,
wherein said estimate of said second one of said signals takes into account the estimate of the first signal and the estimate of the first signal modified in dependence on the estimate of the second signal, wherein for each estimate, quantities $\|r-H(v_s+v_e)\|^2, \|r-Hv_s\|^2, 2\Re\{(c_k-\hat{c}_k)^*(e_k^H H^H H v_s - h_k^H r)\}, |c_k-\hat{c}_k|^2 \|h_k\|^2$ are calculated.

38. An apparatus, comprising:
plurality of receiving element means each for receiving a composite signal including at least some of a plurality of signals, wherein the apparatus receives said plurality of signals at the same time; and
processing means for receiving said plurality of receiving element composite signal and providing an estimate of at least two of said plurality of signals, said processing means providing an estimate of a first one of said signals and providing an estimate of a second one of said signals, wherein said processing means, for each already determined estimate of at least one of the estimate of the first one of said signals and the estimate of the second one of said signals with a plurality of potential values, wherein said estimate of said second one of said signals takes into account the estimate of the first signal and the estimate of the first signal modified in dependence on the estimate of the second signal.

* * * * *